Patented May 25, 1943

2,320,098

UNITED STATES PATENT OFFICE 2,320,098

COSMETIC COLORING COMPOSITION

Sverre Quisling, Madison, Wis.

No Drawing. Application October 18, 1939,
Serial No. 300,021

5 Claims. (Cl. 167—85)

This invention relates particularly to a means for coloring and therapeutic treatment of skin, lips and hair by means of suspensions of water insoluble inert finely divided coloring matter in carbohydrate materials.

Certain sugars, notably sucrose, have relatively high antiseptic powers and have been employed for a long period of time for food preservation. It has been found that this antiseptic property, particularly when combined with other antiseptics, notably boric acid, is also useful on the skin, lips and scalp when thin films of the material of my invention have been applied in the treatment of mild infections such as acne, impetigo, dermatitis, and seborrhea. When at least 10%, finely divided sulphur is suspended in these films the material has been found further efficacious in the treatment of scabies and also certain acne conditions.

In the prior art, cosmetic coloring matter and therapeutic agents have depended for their adherence to skin surfaces, to mucous membranes, and to hair shafts, either by the adherent power of a greasy base material, or by the roughness of the skin, or by their inherent ability to chemically combine with animal tissues. A purpose of this invention is to obtain coloring material which will adhere to the skin surfaces without the use of grease, which will not rub off with ordinary friction and which will not in any way stain the body tissues.

A further object of my invention is to make it possible to apply cosmetic or therapeutic materials quickly and easily and to be able to remove them just as easily and quickly, using only water.

My invention further obviates certain common dangers such as those due to allergy and idiosyncrasy to certain dyes present in some cosmetic coating materials and also present in hair dyes in present-day practice.

Hair, skin and mucous membranes coated with the products of my invention have been noted to take on a more healthful appearance. Literally speaking, preparations of my invention might well be termed a tissue food.

Hair, lips, and skin coated with the materials of my invention seem to take on a much more natural appearance than when coated with products of the prior art and my material is also non-staining. The products of my invention do not come off with ordinary friction. Lips coated with my material when dry, do not smear if rubbed, as they do with greasy lipstick.

The present invention also offers a new and useful field for certain surplus carbohydrates. The present invention provides a product having elastic, rubber-like properties which contains an appreciable amount of carbohydrate and suspended water insoluble coloring material. This product provides the elastic properties of rubber at low cost with the additional advantage of resistance to high temperatures without melting.

It is not the purpose of this invention to limit the manner of preparation of the material, as it may be made according to various formulae now employed in preparation of candy and other carbohydrate materials with the exception that my preparation contains a suspension of water insoluble materials therein. It has been found that varying amounts of inert coloring pigment material produce various shades of color, but for purposes of example it may be cited that 10 to 50% by volume of the following pigments were very useful in connection with water soluble carbohydrate materials employed containing monosaccharides and/or disaccharides such as sucrose, lactose, dextrose and maltose: Lamp-black (carbon) for black, iron oxide (yellow-ochre) for yellow, iron oxide red for red, iron oxide brown for brown, iron oxide black for black and zinc oxide white for white. Other coloring materials including pigment lakes, colored oxides, colored sulphides and/or other water insoluble coloring materials, alone or in combination therewith, were found useful. It is not the purpose of this description to limit the invention to the specific pigments which have been noted herein by way of example and not as limitations. However, the pigments mentioned herein have been found to have particular merit, both for their harmlessness and their therapeutic value as well as their excellent coloring qualities.

It was found that certain shades of color frequently would result from the use of a number of pigments incorporated in a single basic mix. For example, carbon, zinc oxide and various shades of iron oxide were necessary to produce certain shades of yellow, red, orange, and brown.

One of the means of dispensing the material of my invention is on applicators or on combs which may be moistened with water for application to tissues to be colored as described in my co-pending patent application Serial No. 283,648 entitled "Applicators for plastic coatings," filed July 10, 1939. Another means of dispensing the material of my invention is from the surface coating on a container containing water and an applicator as described in my co-pending patent application No. 287,449 applied for July 31, 1939, entitled "Containers." Another means of dispensing is in containers containing a hardened cake of the material of my invention from which the desired amount of the coloring material is removed and applied by use of a moistened brush. This last method has been found to be particularly useful for coating hair in the manner now employed for dyeing hair. It has been found that after coloring hair in this manner the application of an oil, particularly mineral oil, tends to fix the coloring material on the surface so that it is less liable to be rubbed off on friction.

A convenient formula for use in connection with the last mentioned method of applying my coloring material which required very little moistening to obtain the desired amount of coloring material, was prepared as follows: 4 parts sucrose, either with or with 2 parts water, were heated to melting and to this was added about 1½ parts by volume finely divided pigment material, ¼ part boric acid, and ¼ part protein (either gelatin or zein) which was stirred thoroughly and the resultant product poured out to cool and harden in suitable dispensing containers, or applicators coated therewith. Another formula found useful for this purpose contained the above ingredients prepared as described with one-fourth part of sulphonated castor oil added to the material while still in the liquid form. Larger amounts of sulphonated oil tended to make the product soft and even semi-liquid when cooled. This fluid material which would not harden and was not useful as a coating material proved to be an excellent scale-remover in the scalp and had a lasting beneficial effect on seborrhea or dandruff.

Protein materials in the form of zein (vegetable protein) or gelatin (animal protein) were added in amounts up to 10% by volume to melted sugar without materially altering the properties or the homogenicity of the final product and perhaps somewhat decreased water solubility. However, when as much as 20% or more, and particularly when as much as 50% by volume of protein in the form of gelatin was added to molten sugar, entirely different results occurred. To introduce gelatin into the molten sugar material it was necessary first to let the dry gelatin absorb an equal volume of water before adding or it would not go into solution with the molten sugar material. The product resulting from the admixture of hydrated gelatin of this type in a quantity upwards of 20% by volume to molten sucrose had the appearance and general properties of India rubber. Kneading and heating the material increased the elasticity and flexibility of the product which elastic properties did not disappear on cooling or allowing to stand for a period of time involving a number of weeks. These rubber-like properties were further enhanced by the addition of at least 1% triacetin and/or triethylene glycol, di 2 ethylbutyrate, dibutyl phthalate, dimethyl phthalate, or other cellulose ester plasticizer, in an organic solvent such as acetone. Sulphonated castor oil in an appreciable amount, for example 10% by volume added just after having added the hydrated gelatin to the molten sucrose and continuing heating and stirring also tended to further enhance these properties. Such materials containing 20% and upwards of finely divided zinc oxide and/or charcoal, did not seem to have any of their rubber-like properties impaired. Heating molten sulphur with the final product seemed to increase its hardness and decrease its water solubility. It was found the monosaccharides, more especially lactose, when treated similarly to sucrose reacted in much the same manner to form rubber-like materials. Also the combination of dextrin in combination with sucrose, sulphonated castor oil, and suspended pigment materials, formed a product of very near rubber-like appearance and characteristics.

Having thus described my invention what I claim is:

1. A composition of matter adapted to form a non-toxic color coating for hair and skin comprising at least 50% saccharide in candy-like form selected from the group consisting of sucrose, lactose, dextrose and maltose, which contains protein material selected from the group consisting of zein and gelatin, and at least 10% water insoluble pigment material.

2. A composition of matter adapted to form a non-toxic color coating for hair and skin comprising at least 50% saccharide in candy-like form selected from the group consisting of sucrose, lactose, dextrose and maltose, which contains at least 10% water insoluble pigment material and at least 2% protein material selected from the group consisting of gelatin and zein.

3. A composition of matter adapted to form a non-toxic color coating for hair, skin and the like comprising at least 50% saccharide in candy-like form selected from the group consisting of sucrose, lactose, dextrose and maltose which contains at least 2% zein and at least 10% water insoluble pigment material.

4. A composition of matter adapted to form a non-toxic color coating for hair, skin and the like comprising at least 50% saccharide in candy-like form selected from the group consisting of sucrose, lactose, dextrose and maltose which contains at least 2% gelatin and at least 10% water insoluble pigment material.

5. A composition of matter adapted to form a non-toxic color coating for hair, skin and the like comprising at least 50% sucrose which contains at least 2% protein selected from the group consisting of zein and gelatin and at least 10% water insoluble pigment material.

SVERRE QUISLING.